(12) United States Patent
Van Tiem et al.

(10) Patent No.: US 8,061,947 B2
(45) Date of Patent: Nov. 22, 2011

(54) FASTENER RETENTION SYSTEM

(75) Inventors: Ryan Van Tiem, Rochester Hills, MI (US); Edward L. Kaiser, Orion, MI (US); David A Galey, Saint Croix, IN (US); Mark Adams, Jeffersonville, IN (US)

(73) Assignees: GM Global Technology Operations LLC, Detroit, MI (US); Hitachi Cable Indiana, Inc., New Albany, IN (US)

( * ) Notice: Subject to any disclaimer, the term of this patent is extended or adjusted under 35 U.S.C. 154(b) by 281 days.

(21) Appl. No.: 12/424,908

(22) Filed: Apr. 16, 2009

(65) Prior Publication Data

US 2010/0266366 A1    Oct. 21, 2010

(51) Int. Cl.
*F16B 43/00411*    (2006.01)
(52) U.S. Cl. .......................... 411/533; 411/368
(58) Field of Classification Search .................. 411/533, 411/111, 132, 147, 150, 368, 542, 999, 970, 411/516, 353, 369
See application file for complete search history.

(56) References Cited

U.S. PATENT DOCUMENTS

| | | | | |
|---|---|---|---|---|
| 3,910,588 A | * | 10/1975 | Austin | 411/542 |
| 4,757,661 A | * | 7/1988 | Hasan | 52/410 |
| 4,907,927 A | * | 3/1990 | Choiniere | 411/368 |
| 5,536,124 A | * | 7/1996 | Silva | 411/85 |
| 5,562,380 A | * | 10/1996 | Hempfling et al. | 411/542 |
| 5,584,628 A | * | 12/1996 | Bernoni | 411/84 |
| 6,296,431 B1 | * | 10/2001 | Miller | 411/353 |

FOREIGN PATENT DOCUMENTS

JP    05-071417    3/1993

* cited by examiner

*Primary Examiner* — Gary Estremsky
(74) *Attorney, Agent, or Firm* — Quinn Law Group, PLLC

(57) ABSTRACT

An apparatus includes structure defining a first hole that is characterized by an opening. A protuberance surrounds the opening and at least partially defines a concavity. A retention member is disposed within the concavity, and defines a second hole. The second hole has a first portion characterized by a first diameter and a second portion characterized by a second diameter. A threaded fastener has a flange characterized by a third diameter greater than the first diameter and less than the second diameter. The flange is disposed within the second portion of the second hole and between the first portion of the retention member hole and the first surface. Accordingly, the retention member retains the fastener in the concavity while permitting radial movement of the fastener.

9 Claims, 1 Drawing Sheet

FASTENER RETENTION SYSTEM

TECHNICAL FIELD

The invention relates to fastener retention devices.

BACKGROUND OF THE INVENTION

Assembly of complex articles of manufacture, such as automobiles, often includes the connection of a preassembled first component to a second component. The connection may, for example, be accomplished using threaded fasteners, such as bolts or nuts. If bolts or nuts are employed, then the connection of the preassembled first component to the second component may involve manual insertion of the bolts or nuts into holes formed in the preassembled first component.

SUMMARY OF THE INVENTION

An apparatus includes structure having a first surface and defining a structure hole that is characterized by an opening at the first surface. A protuberance extends from the first surface around the opening, and has a second surface that cooperates with the first surface to define a concavity. A retention member having an outer surface is retained within the concavity by interaction between the outer surface of the retention member and the second surface of the protuberance. The retention member has an inner surface that defines a retention member hole. The retention member hole has a first portion characterized by a first diameter and a second portion characterized by a second diameter.

A threaded fastener has a flange characterized by a third diameter greater than the first diameter and less than the second diameter. The flange is disposed within the second portion of the retention member hole, between the first portion of the retention member hole and the first surface. Accordingly, the retention member retains the fastener within the concavity because the diameter of the distal portion of the second hole is too small for the flange of the fastener to pass through. The retention member permits radial movement of the fastener to accommodate build tolerances because the flange is within a portion of the second hole having a diameter greater than that of the flange.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
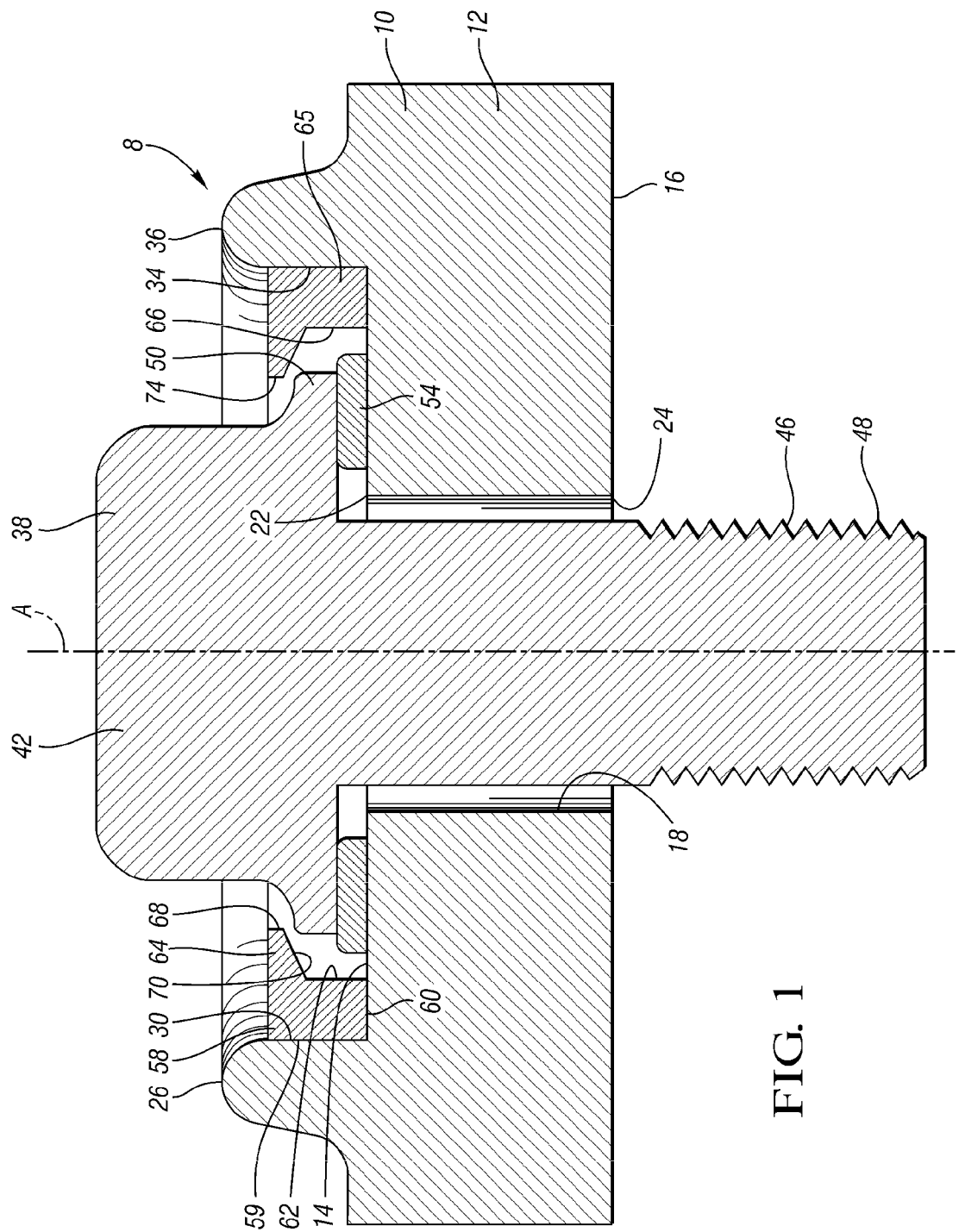
FIG. 1 is a schematic, sectional side view of a prefabricated assembly including a fastener and a retainer ring.

Referring to FIG. 1, a prefabricated assembly 8 includes a first member 10 that is configured for attachment to a second member (not shown). The member 10 includes structure 12 having a first surface 14 and a second surface 16. In the embodiment depicted, the first surface 14 and the second surface 16 face opposite directions. The structure 12 also defines a hole 18 that extends through the structure 12 and that is characterized by a first opening 22 at the first surface 14 and a second opening 24 at the second surface 16. In the embodiment depicted, hole 18 is a cylindrical bore having axis of symmetry A.

The assembly 8 also includes a protuberance 26 extending from the first surface 14 and surrounding the first opening 22. The protuberance 26 defines a third surface 30. The third surface 30 cooperates with the first surface 14 to define a concavity 34, which is characterized by an opening 36. In the embodiment depicted, the protuberance 26 is annular, and, accordingly, the third surface 30 and the concavity 34 are generally cylindrical. The concavity 34 is symmetrical about axis A; thus, the concavity 34 and the hole 18 in the embodiment depicted are coaxial.

The assembly 8 also includes a threaded fastener 38. The fastener 38 includes a head portion 42 that is characterized by a generally polygonal cross-sectional shape. In the embodiment depicted, the head portion 42 is generally hexagonal, though other cross-sectional shapes may be employed within the scope of the claimed invention. The head portion 42 extends from inside the concavity 34 to outside the concavity 34 through the opening 36. The fastener 38 in the embodiment depicted also includes a shank 46 that is rigidly connected to the head portion 42. The shank extends through the hole 18 and through the second opening 24 such that a portion of the shank 46 is exposed at surface 16. The shank 46 includes threads 48. The fastener 38 also includes an annular flange 50 that is disposed within the concavity 34. In the embodiment depicted, the flange 50 protrudes radially outward from the base of the head portion 42. The fastener 38 is positioned such that the longitudinal axis of the fastener is generally coextensive with axis A.

A washer 54 is disposed between the flange 50 and the surface 14. The fastener 38 is engageable with a corresponding fastening element (not shown) on the second member (not shown) to operatively connect the first member 10 to the second member. Exemplary corresponding fastening elements engageable with the fastener 38 include threaded holes formed in the second member, threaded nuts, etc. As understood by those skilled in the art, engagement of the fastener 38 with the corresponding fastening element is accomplished via rotation of the fastener 38 about its longitudinal axis.

The prefabricated assembly 8 further includes a retention ring 58 that is configured to retain the fastener 38 to the member 10, e.g., during shipping of the assembly 8 and during attachment of the assembly 8 to the second member, while permitting rotation of the fastener 38 with respect to the member 10 about axis A to engage the fastener 38 with the corresponding fastening element. More specifically, the retention ring 58 is characterized by an outer surface 59, a base surface 60, an inner surface 62, and a flange 64. The outer surface 59 is generally cylindrical, and abuts the cylindrical surface 30 of the protuberance 26.

In an unstressed state, the diameter of the outer surface 59 is slightly larger than the diameter of surface 30; when the retention ring 58 is inserted into the concavity 34 via opening 36, the retention ring 58 is elastically deformed under compression so that the ring 59 exerts a radial force on surface 30. Friction between surfaces 59 and 30 maintains the retention ring 58 inside the concavity 34. In the embodiment depicted, the ring 58 is comprised of a polymeric material. Base surface 60 contacts surface 14.

The inner surface 62 defines a hole 74. The flange 64 extends radially inward from the base portion 65 of the ring 58 such that the diameter of the hole 74 varies in the axial direction. More specifically, the portion 66 of the inner surface 62 at the base portion 65 is generally axially oriented and has a diameter greater than the diameter of the flange 50 of the fastener 38. Thus, portion 66 defines a portion of the hole 74 that has a diameter larger than the diameter of the flange 50. The flange 64 defines a portion 68 of the inner surface 62 of the ring 58 that is generally axially oriented and that has a diameter that is less than the diameter of the flange 50 of the fastener 38. Thus, portion 68 defines a portion of the hole 74 that has a diameter that is smaller than the diameter of the flange 50. The flange 64 also defines a portion 70 of the inner surface 62 of the ring 58 that interconnects portions 66 and 68, and thus extends both radially and axially.

The head portion 42 of the fastener 38 extends out of the hole 74, and thus the head portion 42 is accessible to a wrench or other device to apply torque to the fastener 38, as understood by those skilled in the art. The hole 74 is symmetrical about axis A. The flange 50 of the fastener 38 is maintained in the hole 74 by portion 70. That is, axial movement of the fastener 38 is limited by interaction between portion 70 and the flange 50. The flange 64 is spaced sufficiently far from the base surface 60 such that there is axial clearance between inner surface portion 70 and the flange 50 of the fastener 38. The axial clearance prevents the ring 58 from interfering with rotation of the fastener about axis A.

The ring 58 is configured such that there is radial clearance between the flange 50 and the portions 66, 70 of the inner surface so that the fastener 38 is selectively movable in the radial direction. Radial movement of the fastener 38 accommodates assembly tolerances during attachment of the first member 10 to the second member (not shown).

Thus, assembly 8 includes structure (namely the ring 58 and the member 12) that defines a chamber coextensive with the hole 74. That is, surface 14 of member 12 and inner surface 62 of ring 58 define a chamber that is coextensive with the hole 74 and that is characterized by an opening at 68. The diameter of the opening of the chamber, i.e., the diameter of inner surface portion 68, is smaller than the diameter of the chamber, i.e., the diameter of inner surface portion 66. The diameter of the flange 50 is greater than the diameter of the opening of the chamber (at inner surface portion 68) and the diameter of the hole 18, but is less than the diameter of the chamber, i.e., the diameter of inner surface portion 66.

In the embodiment depicted, the threaded fastener 38 is a bolt. Alternatively, and within the scope of the claimed invention, the threaded fastener may be a captured nut. In such an embodiment, the nut is positioned within the concavity 34 or chamber, and the hole of the nut is aligned with the hole 18 to receive a bolt or threaded stud.

In the embodiment depicted, the structure 12 defining the hole 18, surfaces 14, 16, and protuberance 26 is part of a first piece of material, and the retention ring 58 is formed of a second, separate piece of material. However, and within the scope of the claimed invention, the structure defining the hole 18, surface 14, 16, protuberance 26, and inner surface 62 may comprise any number of pieces of material. For example, in an alternative embodiment, and within the scope of the claimed invention, surface 62 and hole 18 are defined by a single piece of material. In another embodiment, and within the scope of the claimed invention, separate pieces of material may cooperate to form structure defining the hole 18 and the protuberance 26.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
   structure having a first surface and defining a structure hole that is characterized by an opening at the first surface;
   a protuberance extending from the first surface around the opening, said protuberance having a second surface that cooperates with the first surface to define a concavity;
   a retention member being disposed within the concavity, and having an outer surface abutting the second surface and an inner surface that defines a retention member hole, said retention member hole having a first portion characterized by a first diameter and a second portion characterized by a second diameter; and
   a threaded fastener having a first flange characterized by a third diameter greater than the first diameter and less than the second diameter, said flange being disposed within the second portion of the retention member hole and between the first portion of the retention member hole and the first surface;
   wherein the retention member includes a second flange that defines the first portion of the retention member hole.

2. The apparatus of claim 1, wherein the threaded fastener includes a portion characterized by a polygonal cross-sectional shape and extending through the first portion of the retention member hole.

3. The apparatus of claim 2, wherein the threaded fastener is a bolt having a threaded shank that extends into the structure hole.

4. The apparatus of claim 1, wherein the retention member is comprised of a polymeric material.

5. An apparatus comprising:
   structure having a first surface and a second surface, defining a structure hole that extends through the structure and that is characterized by a first opening at the first surface and a second opening at the second surface;
   an annular protuberance extending from the first surface around the first opening, said annular protuberance having a cylindrical third surface that cooperates with the first surface to define a generally cylindrical concavity;
   a retention ring being disposed within the concavity, and having a cylindrical outer surface abutting the third surface and an inner surface that defines a retention ring hole, said retention ring hole having a first portion characterized by a first diameter and a second portion characterized by a second diameter; and
   a threaded fastener being selectively rotatable about an axis and having a first flange characterized by a third diameter greater than the first diameter and less than the second diameter;
   wherein the first flange is disposed within the second portion of the retention ring hole and between the first portion of the retention ring hole and the first surface;
   wherein the retention ring is comprised of a polymeric material; and
   wherein the retention ring is subjected to compressive stress by the third surface.

6. The apparatus of claim 5, wherein the threaded fastener includes a portion characterized by a polygonal cross-sectional shape and that extends through the first portion of the retention ring hole.

7. The apparatus of claim 5, wherein the threaded fastener is a bolt having a threaded shank that extends through both the first and second openings.

8. The apparatus of claim 5, wherein the retention ring includes a second flange that defines the first portion of the retention member hole; wherein the retention ring includes a base surface in contact with the first surface; and wherein second flange is spaced axially from the first flange.

9. An apparatus comprising:
structure having a first surface and defining a structure hole that is characterized by an opening at the first surface;
a protuberance extending from the first surface around the opening, said protuberance having a second surface that cooperates with the first surface to define a concavity;
a retention member being disposed within the concavity, and having an outer surface abutting the second surface and an inner surface that defines a retention member hole, said retention member hole having a first portion characterized by a first diameter and a second portion characterized by a second diameter; and
a threaded fastener having a first flange characterized by a third diameter greater than the first diameter and less than the second diameter, said flange being disposed within the second portion of the retention member hole and between the first portion of the retention member hole and the first surface;
wherein the retention member includes a second flange that defines the first portion of the retention member hole;
wherein the retention member includes a base surface in contact with the first surface; and
wherein second flange is spaced axially from the first flange.

* * * * *